United States Patent
Channakeshava

(10) Patent No.: US 9,116,872 B1
(45) Date of Patent: Aug. 25, 2015

(54) METHOD AND APPARATUS FOR MAPPING DATA SETS TO FIELDS IN ELECTRONIC FORMS

(75) Inventor: Girish Mallenahally Channakeshava, Bangalore (IN)

(73) Assignee: INTUIT INC, Mountain View, CA (US)

( * ) Notice: Subject to any disclaimer, the term of this patent is extended or adjusted under 35 U.S.C. 154(b) by 149 days.

(21) Appl. No.: 13/013,485

(22) Filed: Jan. 25, 2011

(51) Int. Cl.
*G06F 3/00* (2006.01)
*G06F 17/24* (2006.01)
*G06F 17/30* (2006.01)

(52) U.S. Cl.
CPC ........ *G06F 17/243* (2013.01); *G06F 17/30867* (2013.01)

(58) Field of Classification Search
CPC .......... G06F 17/30867; G06F 17/2785; G06F 17/243; G06F 3/0237; G06F 3/0483; G06F 17/30699
USPC ......................................... 715/224, 225, 226
See application file for complete search history.

(56) References Cited

U.S. PATENT DOCUMENTS

| | | | | |
|---|---|---|---|---|
| 6,651,217 | B1 * | 11/2003 | Kennedy et al. | 715/224 |
| 2002/0013788 | A1 * | 1/2002 | Pennell et al. | 707/507 |
| 2005/0262452 | A1 * | 11/2005 | Sauermann | 715/853 |
| 2006/0085515 | A1 * | 4/2006 | Kurtz et al. | 709/207 |
| 2006/0101443 | A1 * | 5/2006 | Nasr | 717/163 |
| 2007/0113168 | A1 * | 5/2007 | de Souza et al. | 715/507 |
| 2007/0123194 | A1 * | 5/2007 | Karaoguz et al. | 455/403 |
| 2007/0256062 | A1 * | 11/2007 | Madden | 717/141 |
| 2008/0202823 | A1 * | 8/2008 | Won et al. | 178/18.01 |
| 2009/0150258 | A1 * | 6/2009 | Nokes et al. | 705/27 |
| 2009/0288034 | A1 * | 11/2009 | Childress et al. | 715/781 |
| 2011/0055373 | A1 * | 3/2011 | Bnayahu et al. | 709/224 |
| 2011/0099465 | A1 * | 4/2011 | Haberl | 715/217 |
| 2011/0131530 | A1 * | 6/2011 | Oosterholt | 715/810 |

\* cited by examiner

*Primary Examiner* — Kyle Stork
(74) *Attorney, Agent, or Firm* — Park, Vaughan, Fleming & Dowler LLP

(57) ABSTRACT

One embodiment of the present invention provides a system for mapping data sets to fields in electronic forms to facilitate rapid entry of data. During operation, the system receives a selection of a first field in an electronic form. In response to receiving the selection of the first field, the system retrieves a first set of data items that have previously been entered into the first field. Next, the system highlights the data items in the first set of data items such that each data item in the first set of data items has a different highlight. The system then receives a selection of a first data item from the first set of data items. In response to receiving the selection of the first data item, the system receives a selection of a second field in the electronic form. Next, the system retrieves a second set of data items that have previously been entered into the second field. The system then determines a second data item from the second set of data items that was previously submitted with the first data item. Finally, the system highlights the second data item with a same highlight as the first data item.

17 Claims, 3 Drawing Sheets

METHOD AND APPARATUS FOR MAPPING DATA SETS TO FIELDS IN ELECTRONIC FORMS

BACKGROUND

Related Art

Over the past two decades, the amount of information that is submitted over networks via electronic forms has grown exponentially. From Internet purchases, to filing taxes, to transferring money, virtually all aspects of information traditionally exchanged via paper forms have crossed over to the electronic frontier.

For many users, certain items of information are submitted repeatedly. For example, a user's billing address and account information is typically required every time the user makes an online purchase. Many systems have been developed over the years to aid with this repetitive entry. For example, many web browsers incorporate an "auto complete" feature. When a user selects a form field and starts entering data, the browser will show data previously entered in the form field that matches the entered data. However, these repetitive entry aids do not work well with complex data sets, especially when the data from these data sets is not readily known by the user (data that they have not committed to memory.) For example, the user might select a bank from a list of ten previous financial institutions to which she has transferred money via an online application. In this example, the very next field prompts the user to enter the bank's routing number and presents her with a list of the past ten routing numbers entered. Unless the user has committed the routing number to memory, being presented with the last ten routing numbers provides only marginal help at best.

SUMMARY

One embodiment of the present invention provides a system for mapping data sets to fields in electronic forms to facilitate rapid entry of data. During operation, the system receives a selection of a first field in an electronic form. In response to receiving the selection of the first field, the system retrieves a first set of data items that have previously been entered into the first field. Next, the system highlights the data items in the first set of data items such that each data item in the first set of data items has a different highlight. The system then receives a selection of a first data item from the first set of data items. In response to receiving the selection of the first data item, the system receives a selection of a second field in the electronic form. Next, the system retrieves a second set of data items that have previously been entered into the second field. The system then determines a second data item from the second set of data items that was previously submitted with the first data item. Finally, the system highlights the second data item with a same highlight as the first data item.

In some embodiments of the present invention, the system highlights each data item in the second set of data items with a same highlight as a corresponding data item from the first set of data items.

In some embodiments of the present invention, determining the second data item from the second set of data items additionally involves determining a third data item from the second set of data items wherein both the second data item and the third data item were previously submitted with the first data item during different submissions. In these embodiments, the system highlights the second data item with a secondary highlight such that the highlight and the secondary highlight are both visible. Additionally, the system highlights the third data item with a same highlight as the second data item; however, the system highlights the third data item with a different secondary highlight from the second data item.

In some embodiments of the present invention, highlighting data items involves changing a visual attribute of the data items.

In some embodiments of the present invention, highlighting data items involves changing the color of a text of the data items.

In some embodiments of the present invention, highlighting data items involves changing the color of a background of the data items.

In some embodiments of the present invention, highlighting data items involves changing the color of a border around the data items.

In some embodiments of the present invention, highlighting data items with a secondary highlight involves changing a different visual attribute of the data items than a primary highlight.

In some embodiments of the present invention, highlighting data items with a secondary highlight involves highlighting a different portion of the data items than a primary highlight.

In some embodiments of the present invention, highlighting the second data item additionally involves pre-filling the second field with the second data item.

DETAILED DESCRIPTION

Figure 1:
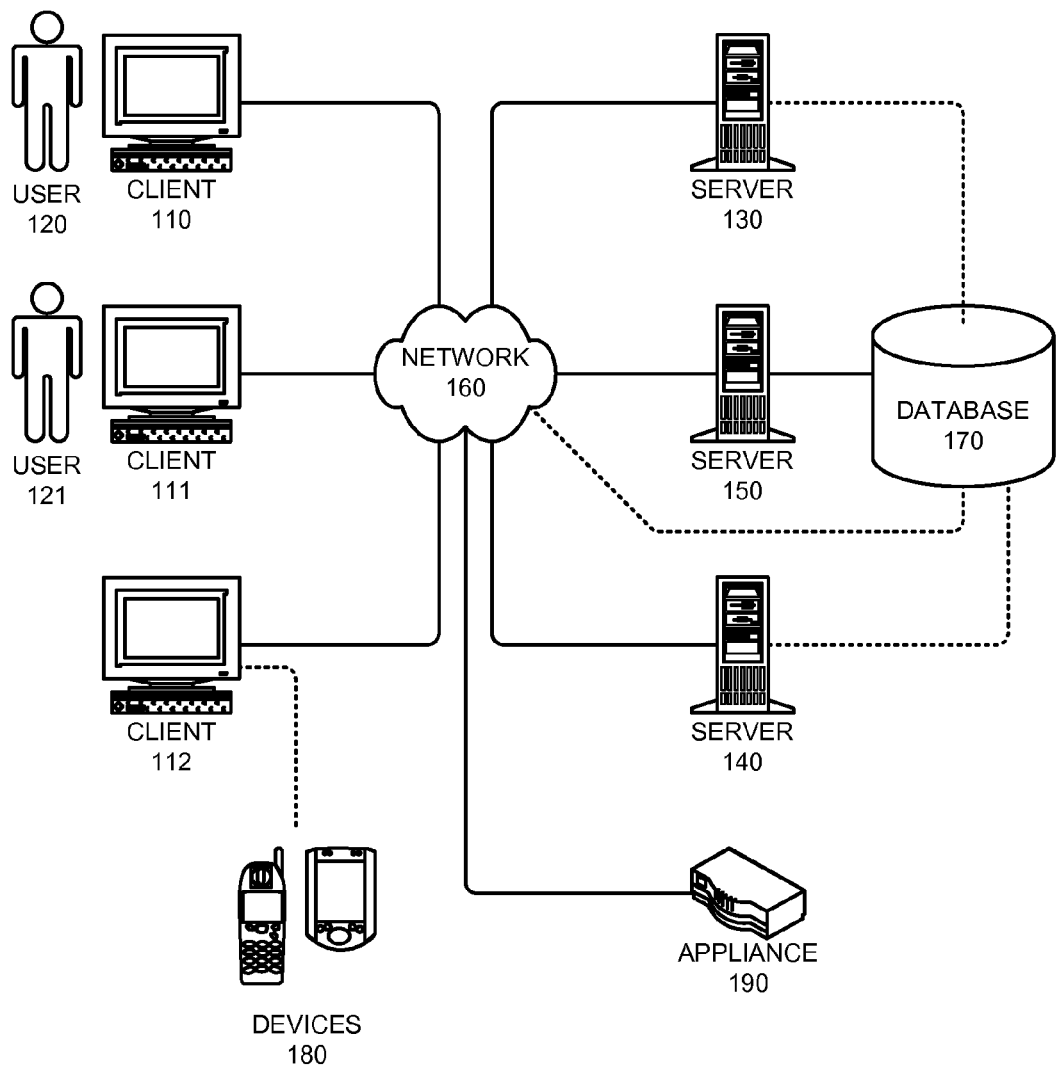
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for mapping data sets to fields in electronic forms to facilitate rapid entry of data. During operation, the system receives a selection of a first field in an electronic form. In response to receiving the selection of the first field, the system retrieves a first set of data items that have previously been entered into the first field. Next, the system highlights the data items in the first set of data items such that each data item in the first set of data items has a different highlight. For example, consider the scenario where a user is using an electronic form to transfer funds from her checking account to a different account at a different financial institution. In this example, the user may first click on a form field asking the user to input the name of the financial institution to which she wants to transfer the funds. Upon clicking on this form field, the system supplies the user with the names of the previously entered financial institutions, such as "ABC Bank" and "ACME Mortgage Company," each with a different highlight. In one embodiment, ABC Bank is highlighted with a blue background, while ACME Mortgage Company is highlighted with a red background.

Upon receiving a selection of a first data item from the first set of data items, the system receives a selection of a second field in the electronic form. Next, the system retrieves a second set of data items that have previously been entered into the second field. The system then determines a second data item from the second set of data items that was previously submitted with the first data item. Finally, the system highlights the second data item with a same highlight as the first data item.

For example, continuing the scenario described above, upon receiving the selection of ABC Bank as the financial institution, the system then receives a selection of a second form field from the user that asks the user to input her account number. Upon receiving the selection of the second form field, the system presents the user with a list of account numbers that have previously been entered into the second form field. Additionally, because the user selected ABC Bank in the first form field, the system highlights the account number in blue that the user entered in a previous submission where she selected ABC Bank as the financial institution.

In some embodiments of the present invention, the system highlights each data item in the second set of data items with a same highlight as a corresponding data item from the first set of data items. For example, the account number for ABC Bank is highlighted in blue while the account number for ACME Mortgage Company is highlighted in red to match the previous highlighting in the first form field. Using this highlighting technique, users can visually see the connected data sets when navigating from one form field to the next. In this example, all data associated with ABC bank is highlighted in blue across all data fields, while all data associated with ACME Mortgage Company is highlighted in red.

In some embodiments of the present invention, determining the second data item from the second set of data items additionally involves determining a third data item from the second set of data items wherein both the second data item and the third data item were previously submitted with the first data item during different submissions. In these embodiments, the system highlights the second data item with a secondary highlight such that the highlight and the secondary highlight are both visible. Additionally, the system highlights the third data item with a same highlight as the second data item; however, the system highlights the third data item with a different secondary highlight from the second data item.

For example, consider the scenario above where the user is transferring money to an account at ABC Bank. As described previously, the user initially selected ABC Bank, highlighted in blue, from the list of financial institutions. Upon selecting the account number field, the system presents the user with the previously entered account numbers, highlighted to match the corresponding data from the financial institution field. However, in this example, the user has two separate accounts at ABC Bank to which she routinely transfers money.

One way to distinguish between the two data sets in the rest of the form fields is to add secondary highlighting. For example, because both account numbers are associated with ABC Bank, highlighted in blue, in the first form field, both account numbers are primarily highlighted in blue in the account number field and secondarily highlighted using a different technique. This secondary highlighting can include any number of highlighting techniques. In one embodiment, the background of both account numbers is blue, while the font for one account number is yellow and the font for the other account number is green. In another embodiment, the left half of the background of both account numbers is blue, while the right half of the background of the first account number is yellow and the right half of the background of the second account number is green. Note that both the primary and secondary highlighting are applied to subsequent data items in the remaining form fields. Also note that the present invention is not meant to be limited to two highlighting techniques. It is possible in some embodiments to have complex overlapping data sets that require three or more different types of highlighting.

In some embodiments of the present invention, highlighting data items involves changing a visual attribute of the data items, including changing the color of the text of the data item, changing the color of the background of the data item, changing the color of the border around the data item, changing the font of the data item, changing the size of the data item, or changing a style of the data item.

In some embodiments, highlighting data items with a secondary highlight involves changing a different visual attribute of the data items than a primary highlight, or highlighting a different portion of the data items than a primary highlight. Determining which portion or style to use is an implementation detail that can be set by the user.

In some embodiments of the present invention, highlighting the second data item additionally involves pre-filling the second field with the second data item. For example, if the user has chosen a specific item for the primary form field, the system may then pre-fill the second form field with the associated item. In the event that there is more than one associated item for the second form field, the system may move the related items to the top of the list.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
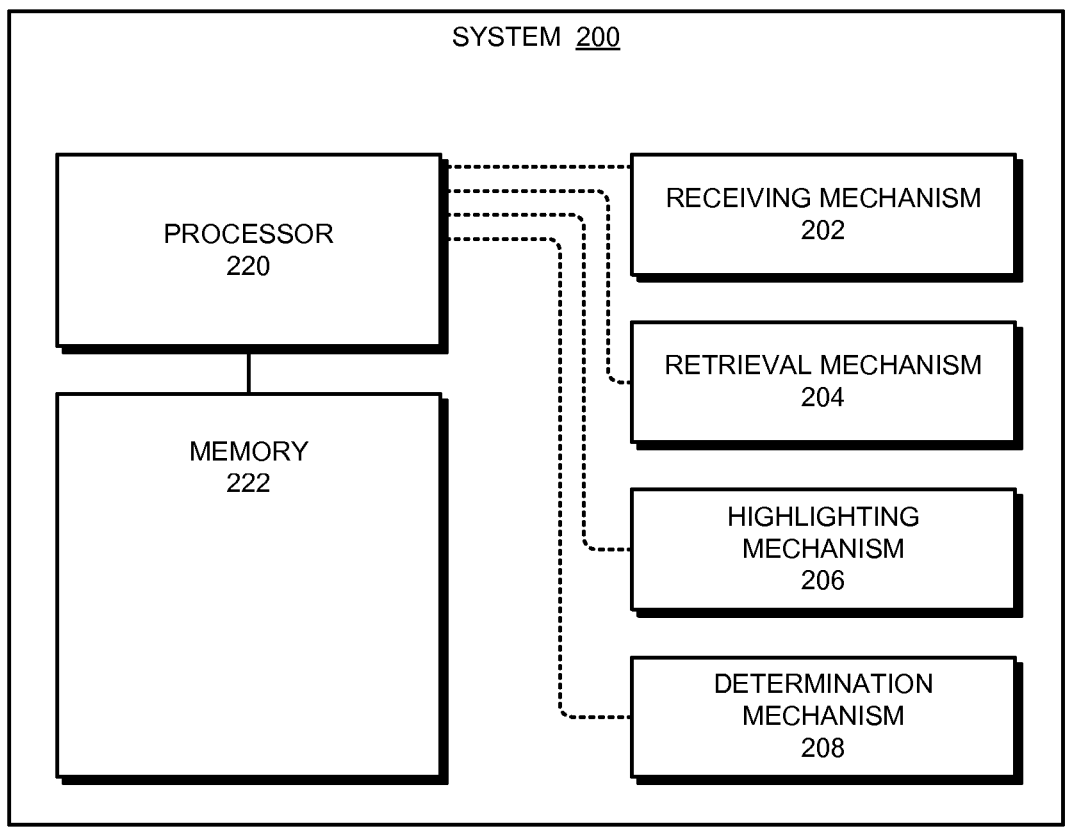
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, retrieval mechanism 204, highlighting mechanism 206, determination mechanism 208, processor 220, and memory 222.

Mapping Data Sets to Fields in Electronic Forms Using Highlighting

Figure 3:
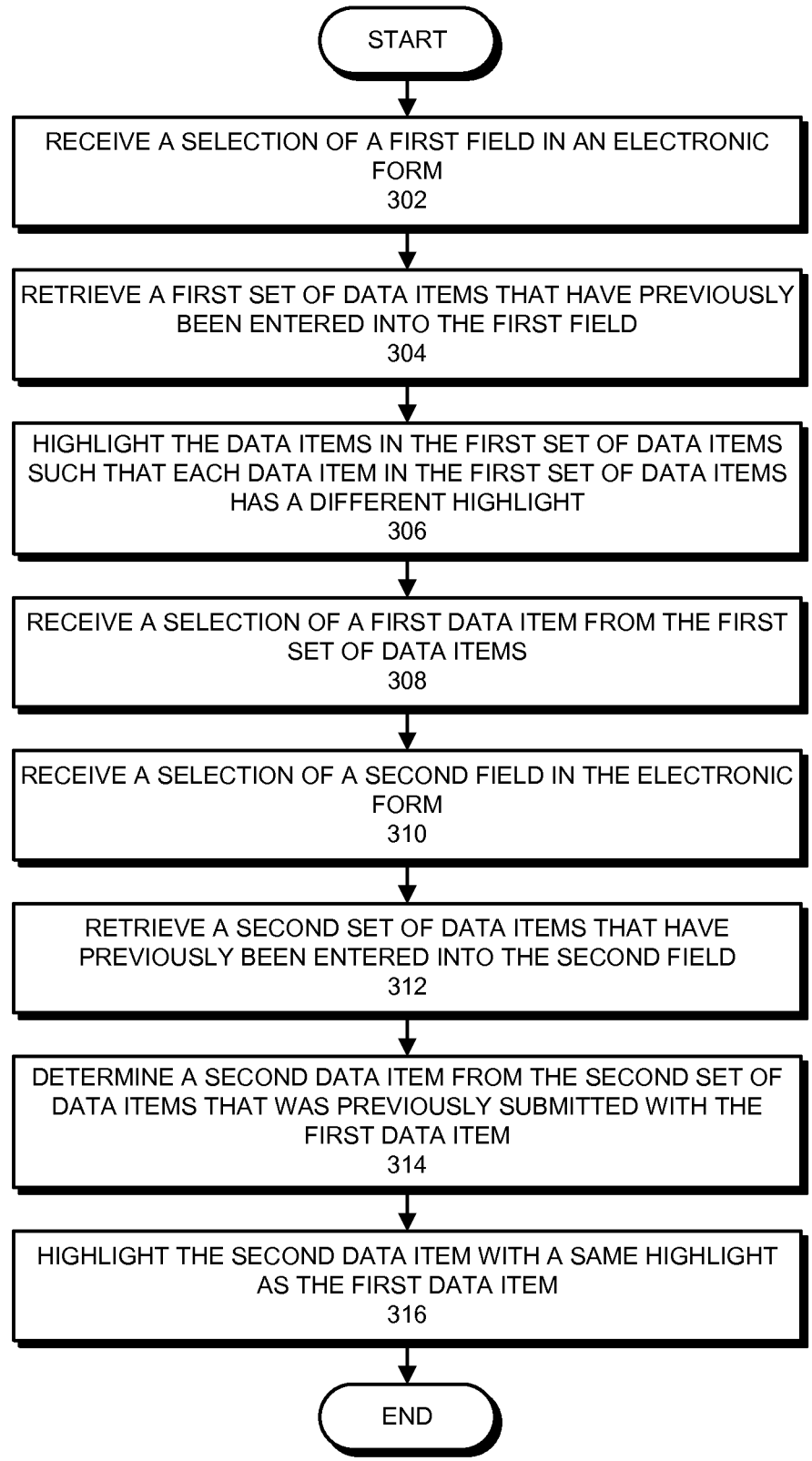
FIG. 3 presents a flow chart illustrating the process of mapping data sets to fields using highlighting in accordance with an embodiment of the present invention.

FIG. 3 presents a flowchart illustrating the process of mapping data sets to fields in electronic forms using highlighting in accordance with an embodiment of the present invention. During operation, receiving mechanism 202 receives a selection of a first field in an electronic form (operation 302). Next, retrieval mechanism 204 retrieves a first set of data items that have previously been entered into the first field (operation 304). Highlighting mechanism 206 then highlights the data items in the first set of data items such that each data item in the first set of data items has a different highlight (operation 306). Next, receiving mechanism 202 receives a selection of a first data item from the first set of data items (operation 308). Receiving mechanism 202 additionally receives a selection of a second field in the electronic form (operation 310). Retrieval mechanism 204 then retrieves a second set of data items that have previously been entered into the second field (operation 312). Next, determination mechanism 208 determines a second data item from the second set of data items that was previously submitted with the first data item (operation 314). Finally, highlighting mechanism 206 highlights the second data item with a same highlight as the first data item (operation 316).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for mapping data sets to fields in electronic forms to facilitate rapid entry of data, the method comprising:
   receiving, by computer, a selection of a first field in an electronic form;
   retrieving, by computer, a first set of data items that have previously been entered into the first field;
   highlighting, by computer, the data items in the first set of data items such that each data item in the first set of data items has a different highlight;
   receiving, by computer, a selection of a first data item from the first set of data items;
   receiving, by computer, a selection of a second field in the electronic form;
   retrieving, by computer, a second set of data items that have previously been entered into the second field;
   determining, by computer, a second data item and a third data item from the second set of data items that were previously submitted with the first data item during different submissions of the electronic form;
   in response to determining that the second data item and the third data item in the second set of data items corresponds to the first data item, highlighting the second data item and the third data item with a same primary highlight as the first data item, and highlighting the second data item and the third data item with different secondary highlights, wherein highlighting data items with a secondary highlight involves changing a different visual attribute of the data items than a primary highlight; and
   applying, by computer, the primary highlight and the secondary highlights to additional data items from additional data sets corresponding to additional fields in the electronic form to enable a user to visualize in one view the connections between the data items from the data sets corresponding to the different fields from prior submissions of the electronic form.

2. The computer-implemented method of claim 1, further comprising highlighting each data item in the second set of data items with a same highlight as a corresponding data item from the first set of data items.

3. The computer-implemented method of claim 1, wherein highlighting data items involves changing a visual attribute of the data items.

4. The computer-implemented method of claim 1, wherein highlighting data items involves changing the color of a text of the data items.

5. The computer-implemented method of claim 1, wherein highlighting data items involves changing the color of a background of the data items.

6. The computer-implemented method of claim 1, wherein highlighting data items involves changing the color of a border around the data items.

7. The computer-implemented method of claim 1, wherein highlighting data items with a secondary highlight involves highlighting a different portion of the data items than a primary highlight.

8. The computer-implemented method of claim 1, wherein highlighting the second data item additionally involves pre-filling the second field with the second data item.

9. A non-transitory computer-readable storage medium storing instructions that when executed by a computer cause the computer to perform a method for mapping data sets to fields in electronic forms to facilitate rapid entry of data, the method comprising:
receiving a selection of a first field in an electronic form;
retrieving a first set of data items that have previously been entered into the first field;
highlighting the data items in the first set of data items such that each data item in the first set of data items has a different highlight;
receiving a selection of a first data item from the first set of data items;
receiving a selection of a second field in the electronic form;
retrieving a second set of data items that have previously been entered into the second field;
determining a second data item and a third data item from the second set of data items that were previously submitted with the first data item during different submissions of the electronic form;
in response to determining that the second data item and the third data item in the second set of data items corresponds to the first data item, highlighting the second data item and the third data item with a same primary highlight as the first data item, and highlighting the second data item and the third data item with different secondary highlights, wherein highlighting data items with a secondary highlight involves changing a different visual attribute of the data items than a primary highlight; and
applying the primary highlight and the secondary highlights to additional data items from additional data sets corresponding to additional fields in the electronic form to enable a user to visualize in one view the connections between the data items from the data sets corresponding to the different fields from prior submissions of the electronic form.

10. The non-transitory computer-readable storage medium of claim 9, wherein the method further comprises highlighting each data item in the second set of data items with a same highlight as a corresponding data item from the first set of data items.

11. The non-transitory computer-readable storage medium of claim 9, wherein highlighting data items involves changing a visual attribute of the data items.

12. The non-transitory computer-readable storage medium of claim 9, wherein highlighting data items involves changing the color of a text of the data items.

13. The non-transitory computer-readable storage medium of claim 9, wherein highlighting data items involves changing the color of a background of the data items.

14. The non-transitory computer-readable storage medium of claim 9, wherein highlighting data items involves changing the color of a border around the data items.

15. The non-transitory computer-readable storage medium of claim 9, wherein highlighting data items with a secondary highlight involves highlighting a different portion of the data items than a primary highlight.

16. The non-transitory computer-readable storage medium of claim 9, wherein highlighting the second data item additionally involves pre-filling the second field with the second data item.

17. An apparatus configured for mapping data sets to fields in electronic forms to facilitate rapid entry of data, comprising:
a memory;
a processor;
a receiving mechanism configured to receive a selection of a first field in an electronic form;
a retrieval mechanism configured to retrieve a first set of data items that have previously been entered into the first field;
a highlighting mechanism configured to highlight the data items in the first set of data items such that each data item in the first set of data items has a different highlight;
wherein the receiving mechanism is further configured to receive a selection of a first data item from the first set of data items;
wherein the receiving mechanism is further configured to receive a selection of a second field in the electronic form;
wherein the retrieval mechanism is further configured to retrieve a second set of data items that have previously been entered into the second field;
a determination mechanism configured to determine a second data item and a third data item from the second set of data items that were previously submitted with the first data item during different submissions of the electronic form;
wherein in response to determining that the second data item and the third data item in the second set of data items corresponds to the first data item, the highlighting mechanism is further configured to highlight the second data item and the third data item with a same primary highlight as the first data item, and highlighting the second data item and the third data item with different secondary highlights, wherein highlighting data items with a secondary highlight involves changing a different visual attribute of the data items than a primary highlight; and
wherein the highlighting mechanism is further configured to apply the primary highlight and the secondary highlights to additional data items from additional data sets corresponding to additional fields in the electronic form to enable a user to visualize in one view the connections between the data items from the data sets corresponding to the different fields from prior submissions of the electronic form.

* * * * *